US012725580B2

(12) United States Patent
Yu

(10) Patent No.: US 12,725,580 B2
(45) Date of Patent: Sep. 1, 2026

(54) STILL IMAGE DETECTION DEVICE AND METHOD

(71) Applicant: VIZION Corporation, Seoul (KR)

(72) Inventor: Alan Tun Hsun Yu, Fremont, CA (US)

(73) Assignee: VIZION Corporation, Seoul (KR)

( * ) Notice: Subject to any disclaimer, the term of this patent is extended or adjusted under 35 U.S.C. 154(b) by 0 days.

(21) Appl. No.: 19/366,843

(22) Filed: Oct. 23, 2025

(65) Prior Publication Data

US 2026/0120652 A1 Apr. 30, 2026

(30) Foreign Application Priority Data

Oct. 24, 2024 (KR) ........................ 10-2024-0146840

(51) Int. Cl.
*G09G 3/34* (2006.01)
*G06F 1/3234* (2019.01)

(52) U.S. Cl.
CPC ......... *G09G 3/3406* (2013.01); *G06F 1/3265* (2013.01); *G09G 2320/0646* (2013.01); *G09G 2330/022* (2013.01); *G09G 2380/08* (2013.01)

(58) Field of Classification Search
CPC ......... G09G 3/3406; G09G 2320/0646; G09G 2330/022; G09G 2380/08; G06F 1/3265
See application file for complete search history.

(56) References Cited

U.S. PATENT DOCUMENTS

2016/0322025 A1* 11/2016 Zhou ........................ G09G 3/34
2018/0041724 A1* 2/2018 Kim ..................... H04N 25/583
2018/0114566 A1* 4/2018 Aoyama .............. H04N 13/332
2018/0182357 A1* 6/2018 Yun ...................... G09G 3/3406
2020/0252555 A1* 8/2020 Choi .................... H04N 19/179
2021/0280143 A1* 9/2021 Tang ........................ G09G 3/32
2022/0020309 A1* 1/2022 Jiao ...................... G09G 3/2074

FOREIGN PATENT DOCUMENTS

JP 2007212688 A * 8/2007 ............... G09G 3/20
KR 10-2005-0040386 A 5/2005
KR 20050040386 A * 5/2005 ............. G09G 3/288
KR 10-2010-0073457 A 7/2010
KR 10-2575844 B1 9/2023

OTHER PUBLICATIONS

Request for the Submission of an Opinion issued Mar. 24, 2025 in Korean Application No. 10-2024-0146840.
Written Decision on Registration issued Jul. 11, 2025 in Korean Application No. 10-2024-0146840.

* cited by examiner

*Primary Examiner* — Temesghen Ghebretinsae
*Assistant Examiner* — Sosina Abebe
(74) *Attorney, Agent, or Firm* — Sughrue Mion, PLLC

(57) ABSTRACT

A still image detection device and method where when a preset specific area of an image output from a surgical imaging device is detected based on an input image type that the image is a still image, the brightness of a display unit is adjusted to preset minimum brightness, and then a pop-up message is displayed, when a preset reference time has elapsed, a panel of the display unit is turned off, and a soft power light-emitting diode (LED) provided in the display unit is controlled to blink, and when a button is clicked according to a user input, or movement of an object is detected in input image information, the panel of the display unit is turned on, and an input image is displayed, thereby preventing the occurrence of afterimages and burnout in a state where a still image is displayed on the display unit for a long time.

6 Claims, 3 Drawing Sheets

STILL IMAGE DETECTION DEVICE AND METHOD

CROSS-REFERENCE TO RELATED APPLICATION

This application claims priority to and the benefit of Korean Patent Application No. 10-2024-0146840, filed on Oct. 24, 2024, the disclosure of which is incorporated herein by reference in its entirety.

BACKGROUND

1. Field of the Invention

The present invention relates to a still image detection device and method, and more particularly, to a still image detection device and method in which, when a preset specific area of an image output from a surgical imaging device is detected and it is detected based on an input image type that the image is a still image, the brightness of a display unit is adjusted to preset minimum brightness, and then a pop-up message is displayed, when a preset reference time has elapsed, a panel of the display unit is turned off, and a soft power light-emitting diode (LED) provided in the display unit is controlled to blink, and when a button is clicked according to a user input, or movement of an object is detected in input image information, the panel of the display unit is turned on, and an input image is displayed.

2. Discussion of Related Art

A monitor is a mechanical device that displays a screen to allow processed results of a computer or the like to be seen on the computer with the eyes.

When such a monitor maintains a turned-on state for a long time, power consumption increases.

In addition, when the same still image is displayed on a monitor for a long time, afterimages and burnout may occur on an organic light-emitting diode (OLED) panel that constitutes the monitor.

RELATED ART DOCUMENTS

Patent Documents (Patent Document 0001) Korean Registered Patent No. 10-2575844 [Title: Electronic device for displaying screen and control method thereof].

SUMMARY OF THE INVENTION

The present invention is directed to providing a still image detection device and method in which, when a preset specific area of an image output from a surgical imaging device is detected and it is detected based on an input image type that the image is a still image, the brightness of a display unit is adjusted to preset minimum brightness, and then a pop-up message is displayed, when a preset reference time has elapsed, a panel of the display unit is turned off, and a soft power light-emitting diode (LED) provided in the display unit is controlled to blink, and when a button is clicked according to a user input, or movement of an object is detected in input image information, the panel of the display unit is turned on, and an input image is displayed.

The present invention is also directed to providing a still image detection device and method in which, in a state in which it is identified based on an input image type that an image is a general image, when the image is detected to be a still image in which there is no movement in the entire image, the brightness of a display unit is adjusted to preset minimum brightness, and a pop-up message is displayed.

According to an aspect of the present invention, there is provided a still image detection device including a camera unit configured to acquire image information related to a preset area, a control unit configured to perform control such that the acquired image information is displayed on a display unit, and the display unit which analyzes the image information being displayed to identify an image type, when the identified image type of the image information is identified to be surgery scene image information related to a preset special purpose as a result of the identification, analyzes a preset specific area of the surgery scene image information to determine whether the surgery scene image information is a still image, when the surgery scene image information is determined to be the still image as a result of the determination, adjusts brightness of the display unit to preset minimum brightness, and displays a preset pop-up message, and when the brightness of the display unit is adjusted to the minimum brightness and a time for which the pop-up message is displayed exceeds a preset reference time, turns off a panel of the display unit, and controls a soft power LED provided in the display unit to blink.

The preset area may include an area related to the preset special purpose and an area of interest according to a user setting.

The display unit may include a microcomputer, and when the identified image type of the image information is identified to be general image information related to a preset area of interest as a result of the identification, an entire image of the general image information may be analyzed to determine whether the general image information is a still image, when the general image information is determined to be the still image as a result of the determination, the brightness of the display unit may be adjusted to the preset minimum brightness, and the preset pop-up message is displayed, and when a preset event occurs, the brightness of the display unit in a minimum brightness state may be adjusted to the preset basic brightness, the display of the pop-up message may be stopped, and additionally acquired image information may be displayed.

According to another aspect of the present invention, there is provided a still image detection method including acquiring, by a camera unit, image information related to a preset area, displaying, by a control unit, the acquired image information on a display unit, analyzing, by the display unit, the image information being displayed to identify an image type, when the identified image type of the image information is identified to be surgery scene image information related to a preset special purpose as a result of the identification, analyzing, by the display unit, a preset specific area of the surgery scene image information to determine whether the surgery scene image information is a still image, when the surgery scene image information is determined to be the still image as a result of the determination, adjusting, by the display unit, brightness of the display unit to preset minimum brightness, and displaying a preset pop-up message, and when the brightness of the display unit is adjusted to the minimum brightness and a time for which the pop-up message is displayed exceeds a preset reference time, turning off, by the display unit, a panel of the display unit, and controlling a soft power LED provided in the display unit to blink.

The adjusting of the brightness of the display unit to the preset minimum brightness and the displaying of the preset pop-up message may include a process of displaying, by the display unit, a preset no-signal image when no signal is input to the display unit, a process of reading luminance data of a specific area in the no-signal image at preset time intervals using a histogram, and a process of, when a luminance component of the no-signal image is the same as a luminance component of the read specific area for a preset specific time, recognizing the surgery scene image information as the still image, adjusting the brightness of the display unit to the preset minimum brightness, and displaying the preset pop-up message.

The still image detection method may further include, when a preset event occurs, turning on, by the display unit, a panel of the display unit, and displaying image information additionally acquired through the camera unit.

The still image detection method may further include, when the identified image type of the image information is identified to be general image information related to a preset area of interest as a result of the identification, analyzing, by the display unit, an entire image of the general image information to determine whether the general image information is a still image, when the general image information is determined to be the still image as a result of the determination, adjusting, by the display unit, the brightness to the preset minimum brightness, and displaying a preset pop-up message, and when a preset event occurs, adjusting, by the display unit, the brightness of the display unit in a minimum brightness state to the preset basic brightness, stopping displaying the pop-up message, and displaying additionally acquired image information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
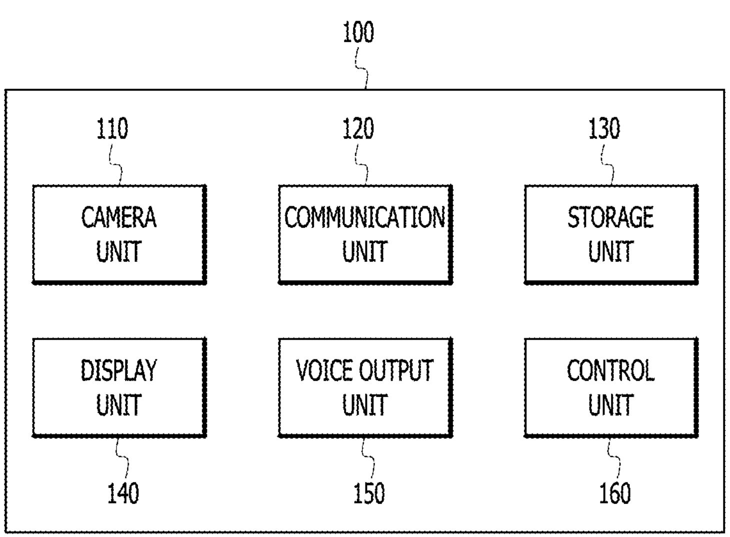
FIG. 1 is a block diagram illustrating a configuration of a still image detection device according to an embodiment of the present invention.

It should be noted that technical terms used in the present invention are merely used to describe specific embodiments and are not intended to limit the present invention. Further, the technical terms used in the present invention should be interpreted to have meanings that are generally understood by those with ordinary skill in the art to which the present invention pertains, unless specifically defined to have different meanings in the present invention, but not be interpreted as an excessively comprehensive meaning or an excessively restricted meaning. In addition, when a technical term used in the present invention is an erroneous term that fails to clearly express the idea of the present invention, it should be replaced by a technical term that can be properly understood by the skilled person in the art. In addition, general terms used in the present invention should be construed according to definitions in dictionaries or according to its front or rear context and should not be construed to have an excessively restrained meaning.

A singular form used in the present invention may include a plural form unless it has a clearly opposite meaning in the context. In the present invention, the terms "consist(s) of" or "include(s) (or comprise(s))" should not be interpreted or understood as including, without exception, all of a plurality of components or a plurality of steps disclosed in the specification. In other words, it should be understood that some of the components or some of the steps may not be included, or that additional components or steps may be further included.

In addition, terms "ordinal numbers" such as "first" and "second" used in the present invention may be used to describe components, but the components should not be limited by the terms. The terms are used only to distinguish one component from another. For example, a first constituent element may be referred to as a second constituent element and similarly, the second constituent element may be referred to as the first constituent element without departing from the scope of the present disclosure.

Hereinafter, exemplary embodiments according to the present invention will be described in detail with reference to the accompanying drawings, and the same or similar components are denoted by the same reference numerals regardless of reference numerals, and a repeated description thereof will be omitted.

In addition, in describing the present invention, when it is determined that specific description of known related art would unnecessarily obscure the gist of the disclosure, the detailed description thereof will be omitted. Further, it is noted that the accompanying drawings are used just for easily appreciating the spirit of the present invention and it should not be interpreted that the spirit of the present invention is limited by the accompanying drawings.

FIG. 1 is a block diagram illustrating a configuration of a still image detection device 100 according to an embodiment of the present invention.

As shown in FIG. 1, the still image detection device 100 includes a camera unit 110, a communication unit 120, a storage unit 130, a display unit 140, a voice output unit 150, and a control unit 160. Not all components of the still image detection device 100 shown in FIG. 1 are essential components, and the still image detection device 100 may be implemented using more or fewer components than the components shown in FIG. 1.

The still image detection device 100 may be applied to a smartphone, a portable terminal, a mobile terminal, a foldable terminal, a personal digital assistant (PDA), a portable multimedia player (PMP) terminal, a telematics terminal, a navigation terminal, a personal computer (PC), a notebook computer, a slate PC, a tablet PC, an ultrabook, a wearable device (for example, a smartwatch, a smart glass, or the like a head mounted display (HMD)), a WiBro terminal, an Internet protocol television (IPTV) terminal, a smart TV, a digital broadcasting terminal, an audio video navigation (AVN) terminal, and various terminals of an audio/video (A/V) system, a flexible terminal, a digital signage device, a home theater system, an information provision center, a call center, and a spatial computer (for example, including a Vision Pro or the like).

The camera unit 110 (or a shooting unit) is provided in an independent form or is provided as a part of the still image detection device 100. In this case, when the camera unit 110 is provided outside the still image detection device 100, the camera unit 110 may further include a communication unit or the like for communicating with the still image detection device 100 (or the communication unit 120).

In addition, the camera unit 110 may include one or more image sensors (camera modules or cameras) to photograph a preset area (or zone). In this case, the camera unit 110 may include a stereo camera, a depth camera, or the like capable of acquiring image information in all directions of 360 degrees. Here, the preset area includes an area including an operating table in an operating room related to a preset special purpose, an area of interest set by a user (for example, including a living room/room in a house, a conference room, a public place, a street, or the inside/outside of a store), or the like.

In addition, the camera unit 110 acquires (or captures) image information (or an image/photo/still image/moving image) related to a corresponding area.

That is, the camera unit 110 acquires (or captures) the image information including surgical scene image information including a surgical scene in a preset surgical room (or surgical room image information including the inside of the surgical room), or general image information (or an image/photo/moving image) related to the area of interest (or a general area of interest).

In addition, the camera unit 110 acquires (or captures) image information (for example, surgical scene image information/operating room image information in a special-purpose operating room or general image information including an area of interest) including an area (or a guideline area) in a preset guideline displayed on a viewfinder screen (or a preview screen) of the camera unit 110.

In addition, one or more camera units 110 process image frames of a still image or a moving image obtained by an image sensor (camera module or camera) in a video call mode, a shooting mode, a video conference mode, or the like. That is, pieces of image data obtained by the image sensor are encoded/decoded using a codec according to each standard. As an example, the camera unit 110 photographs an object (or a subject) and outputs a video signal corresponding to a captured image (subject image).

In addition, an image frame (or image information) processed in the camera unit 110 may be stored in a digital video recorder (DVR), stored in the storage unit 130, or transmitted to an external server or the like through the communication unit 120.

The communication unit 120 communicates with arbitrary internal component or at least one arbitrary external terminal through a wired/wireless communication network. In this case, the arbitrary external terminal may include a server (not shown), a terminal (not shown), or the like. Here, wireless Internet technologies include wireless local area network (WLAN), digital living network alliance (DLNA), wireless broadband (WiBro), world interoperability for microwave access (WiMAX), high speed downlink packet access (HSUPA), high speed uplink packet access (HSUPA), IEEE 802.16, long term evolution (LTE), long term evolution-advanced (LTE-A), LTE based maritime wireless communication (LTE-M), wireless mobile broadband service (WMBS), 5G network/5G communication network, 6G network/6G communication network, wireless smart utility network (Wi-SUN), narrowband Internet of Things (NB-IoT), and the like, and the communication unit 120 transmits or receives data according to at least one wireless Internet technology, including Internet technologies not listed above. In addition, short-range communication technologies may include Bluetooth, Bluetooth low energy (BLE), ANT, ANT+, long range (LoRa), radio frequency identification (RFID), infrared data association (IrDA), ultra-wideband (UWB), ZigBee, near field communication (NFC), ultra sound communication (USC), visible light communication (VLC), Wi-Fi, Wi-Fi Direct, magnetic secure transmission (MST), Beacon, EnOcean, near field magnetic induction (NFMI), Z-WAVE, and SIGFOX. In addition, wired communication technologies may include power line communication (PLC), Universal Serial Bus (USB) communication, Ethernet, serial communication, and optical/coaxial cables.

In addition, the communication unit 120 may transmit or receive information to or from an arbitrary terminal through a USB.

In addition, the communication unit 120 transmits or receives wireless signals to or from a base station, the server, the terminal, or the like on a mobile communication network constructed according to a technical standard or communication method for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), wideband CDMA (WCDMA), HSDPA, HSUPA, LTE, LTE-A, 5G network/5G communication network, or 6G network/6G communication network).

In addition, the communication unit 120 transmits various types of image information or the like acquired through the camera unit 110 to the server, the terminal, or the like under the control of the control unit 160.

The storage unit 130 stores various user interfaces (UIs), graphics user interfaces (GUIs), or the like.

In addition, the storage unit 130 stores data and programs necessary for the operation of the still image detection device 100.

That is, the storage unit 130 may store a plurality of application programs (or applications) executed by the still image detection device 100 and pieces of data and commands for the operation of the still image detection device 100. At least some of these applications may be downloaded from an external server through wireless communication. In addition, at least some of these applications may be present on the still image detection device 100 from the time of shipment for basic functions of the still image detection device 100. Meanwhile, the application program may be stored in the storage unit 130, installed on the still image detection device 100, and executed by the control unit 160 to perform the operation (or function) of the still image detection device 100.

In addition, the storage unit 130 may include at least one storage medium of a flash memory type, a hard disk type, a multimedia card micro type, a card type memory (for example, a secure digital (SD) memory, an extreme digital (XD) memory, or a compact flash (CF) memory), a stick type memory stick, a magnetic memory, a magnetic disk, an optical disk, a random access memory (RAM), a static RAM (SRAM), a read-only memory (ROM), an electrically erasable programmable ROM (EEPROM), a programmable ROM (PROM), an one time PROM, a mask ROM, and a flash ROM. In addition, the still image detection device 100 may operate a web storage that performs a storage function of the storage unit 130 on the Internet or may operate in relation to the web storage.

In addition, the storage unit 130 stores various types of image information or the like acquired through the camera unit 110 under the control of the control unit 160.

The display unit 140 (or a display) may display various types of content such as various menu screens through a UI and/or GUI stored in the storage unit 130 under the control of the control unit 160. Here, the content displayed on the display unit 140 includes a menu screen or the like which includes various types of text or image data (including various types of information data), as well as data such as icons, list menus, and combo boxes. In addition, the display unit 140 may be a touch screen.

In addition, the display unit 140 may include at least one of a liquid crystal display (LCD), a thin film transistor LCD (TFT LCD), an organic light-emitting diode (OLED), a flexible display, a three-dimensional (3D) display, an e-ink display, a light-emitting diode (LED), a beam projector, a goggle-type virtual reality (VR) display, a hologram, and a head-up display (HUD). Here, when the display unit 140 is implemented as a HUD, the display unit 140 may include a projection module to output information through an image projected onto a windshield or window.

In addition, the display unit 140 may be implemented as a touch screen by forming a mutual layer structure with a touch input unit (not shown) or by being integrally formed with the touch input unit.

In addition, the display unit 140 may include a transparent display. The transparent display may be attached to a windshield or window.

In addition, the transparent display may have predetermined transparency and display a predetermined screen. The transparent display may include at least one of a transparent thin film electroluminescent display (TFEL), a transparent OLED, a transparent LCD, a transparent display, and a transparent LED display to have transparency. The transparency of the transparent display may be adjusted.

In addition, the display unit 140 displays image information acquired by the camera unit 110 through a viewfinder screen under the control of the control unit 160.

In addition, the display unit 140 displays various types of image information or the like acquired through the camera unit 110 under the control of the control unit 160. In this case, the display unit 140 includes a microcomputer (or a display control unit) (not shown).

In addition, the display unit 140 identifies (or distinguishes/determines/classifies) an image type by analyzing the image information being displayed. In this case, the display unit 140 may include a microcomputer (or a display control unit) (not shown).

That is, the display unit 140 analyzes a scene in the image information being displayed (or the acquired/captured image information) to identify whether the image information is image information related to a preset special purpose (or special situation) or general image information related to a general area of interest. Here, the image information related to the special purpose (or special situation) includes surgical scene image information related to an operating room, experimental scene image information related to a laboratory, and the like. In this case, the display unit 140 may also identify whether the image information is the image information related to the preset special purpose or the general image information related to the general area of interest based on information about a place in which the camera unit 110 that obtains the image information is installed. Here, the information about the place in which the camera unit 110 is installed includes a unique ID (or unique information/number), location information (or address), installation purpose, and the like in relation to the place in which the camera unit 110 is installed.

When it is identified based on a result of the identification (or a result of the distinguishment/determination/classification) that the image type of the identified image information is the surgical scene image information, the display unit 140 analyzes a preset specific area of the surgical scene image information (or the image information) to determine (or identify) whether the surgical scene image information is a still image.

That is, when the image information is identified to be the image information related to the special purpose as the result of the identification, the display unit 140 processes the areas, excluding the preset specific area among the surgical scene image information (or the image information) which is the image information related to the special purpose, as areas to be ignored because the image information continues to change even when is a moving image, and continuously monitors an image of the specific area to detect (or determine/identify) whether there is movement of an object (or whether the image is a still image). In addition, the specific area may have a quadrangular shape, a rectangular shape, a circular shape, a rhombus shape, a triangular shape, or the like with a preset size based on center coordinates (or preset reference coordinates) of corresponding image information.

When, as the result of the determination (or the result of the identification), it is determined (or identified) based on the analysis of the surgical scene image information (or the image information) that the surgical scene image information is not the still image, the display unit 140 performs (or returns to) a process of analyzing image information (or additional image information) previously acquired (or captured) through the camera unit 110 to identify an image type.

That is, when, as the result of the determination (or the result of the identification), the image of the specific area of the surgical scene image information (or the image information) that is the image information related to the special purpose is continuously monitored, and the movement of the object is detected, the display unit 140 performs (or returns to) a process of analyzing image information (or additional image information) previously acquired (or captured) through the camera unit 110 to identify an image type.

In addition, when, as the result of the determination (or the result of the identification), it is determined based on the analysis of the surgical scene image information (or the image information) that the surgical scene image information is a still image, the display unit 140 adjusts the brightness of the display unit 140 to preset minimum brightness such that a user may recognize a current state and displays (or outputs) a preset pop-up message (for example, including "Still Image Detected Display will sleep in 2 mins").

That is, when, as the result of the determination (or the result of the identification), the image of the specific area of the surgical scene image information (or the image information) that is the image information related to the special purpose is continuously monitored, and movement of an object is not detected for a preset time or more, the display unit 140 adjusts the brightness of the display unit 140 to the preset minimum brightness such that a user may recognize a current state and displays (or outputs) a preset pop-up message (for example, including "Still Image Detected Display will sleep in 2 mins").

In this case, when no signal (or no acquired image information) is input to the display unit 140, the display unit 140 displays (or outputs) a preset no-signal image (or a No signal image).

In addition, the display unit 140 reads (or checks) luminance data (for example, a 32-gray level) of a specific area in the no-signal image at preset time intervals (for example, a 1-second interval) using a histogram, and when a luminance component of the no-signal image is the same as a luminance component (or luminance data) of the read specific area for a preset specific time (for example, 45 minutes or 60 minutes), the display unit 140 recognizes the surgical scene image information as a still image, adjusts the brightness of the display unit 140 to the preset minimum brightness, and displays (or outputs) a preset pop-up message (for example, including "Still Image Detected Display will sleep in 2 mins").

In the present invention, instead of a method in which a standby screen of a general PC or the like does not output an output signal itself from the PC to the display unit 140 according to PC settings (for example, a method in which, when there is no movement of a human interface device (HID) (for example, a mouse or a keyboard), an output signal is not transmitted to the display unit 140 according to program settings for moving image playback or PC settings, it is possible to apply a method in which the display unit 140 analyzes image information, and when the image information is determined to be a still image, the display unit 140 autonomously darkens or turns off a screen.

In addition, when the brightness of the display unit 140 is adjusted to the minimum brightness and a time for which a pop-up message is displayed has passed (or exceeded) a preset reference time (for example, including 30 minutes, 45 minutes, or 60 minutes), the display unit 140 turns off a panel (or an OLED panel) of the display unit 140 such that a user may recognize a current state, and controls a soft power LED (not shown) provided in the display unit 140 to blink.

In addition, when a preset event occurs, the display unit 140 turns on the panel of the display unit 140 and displays (or outputs) image information (or surgical scene image information) additionally acquired through the camera unit 110. Here, the preset event includes a case in which any button constituting the still image detection device 100 is clicked (or selected) according to a user input (or user touch/selection/control), a case in which a touch (or a screen touch) on the display unit 140 is detected, a case in which movement of an object is detected in additionally acquired (or captured/input) image information, or the like.

That is, when the preset event occurs, the display unit 140 turns on the panel of the display unit 140 that is in a turned-off state, stops the operation of the soft power LED that is being controlled to blink, and displays (or outputs) additionally acquired image information (or additional image information/surgical scene image information).

In addition, when it is identified based on the result of the identification (or the result of thy distinguishment/determination/classification) that the image type of the identified image information is general image information, the display unit 140 analyzes the entire image (or entire area) of the general image information (or the image information) to determine (or confirm) whether the image is a still image.

That is, when, as the result of the identification, it is identified that the image information is not the image information related to the special purpose (or when the image information is identified to be the general image information related to the area of interest), irrespective of a type, pattern, or the like of the image information, the display unit 140 continuously monitors the entire image of the general image information (or the image information) to detect (or determine/identify) whether there is movement of an object (or whether the image is a still image).

When, as the result of the determination (or the result of the identification), it is determined based on the analysis of the general image information (or the image information) that the general image information (or the image information) is not the still image, the display unit 140 performs (or returns to) a process of analyzing image information (or additional image information) previously acquired (or captured) through the camera unit 110 to identify an image type.

That is, when, as the result of the determination (or the result of the identification), the entire image of the general image information (or the image information) that is the image information related to the area of interest is continuously monitored, and a movement of an object is detected, the display unit 140 performs (or returns to) a process of analyzing image information (or additional image information) previously acquired (or captured) through the camera unit 110 to identify an image type.

In addition, when, as the result of the determination (or the result of the identification), it is determined based on the analysis of the general image information (or the image information) that the general image information is a still image, the display unit 140 adjusts the brightness of the display unit 140 to preset minimum brightness such that a user may recognize a current state and displays (or outputs) a preset pop-up message (for example, including "Still Image Detected Display will sleep in 2 mins").

That is, when, as the result of the determination (or the result of the identification), an image of the entire area of the general image information (or the image information) that is the image information related to the area of interest is continuously monitored, and a movement of an object is not detected for a preset time or more, the display unit 140 adjusts the brightness of the display unit 140 to the preset minimum brightness such that the user may recognize the current state and displays (or outputs) a preset pop-up message (for example, including "Still Image Detected Display will sleep in 2 mins").

In this case, the display unit 140 reads (or checks) luminance data of the entire area in the general image information at preset time intervals (for example, a 1 second interval) using, and when the same (or identical) luminance data is read for a preset specific time (for example, including 45 minutes or 60 minutes) (or there is no change in luminance data for a preset specific time), the display unit 140 recognizes the general image information as a still image, adjusts the brightness of the display unit 140 to preset minimum brightness, and displays (or outputs) a preset pop-up message (for example, including "Still Image Detected Display will sleep in 2 mins").

In addition, when the brightness of the display unit 140 is adjusted to the minimum brightness and a time for which a pop-up message is displayed has passed (or exceeded) a preset reference time (for example, including 30 minutes, 45 minutes, or 60 minutes), the display unit 140 turns off the panel (or the OLED panel) of the display unit 140 such that the user may recognize a current state, and controls the soft power LED provided in the display unit 140 to blink.

In addition, when a preset event occurs, the display unit 140 turns on (or activates) the panel of the display unit 140 and displays (or outputs) image information (or general image information) additionally acquired through the camera unit 110. Here, the preset event includes a case in which any button constituting the still image detection device 100 is clicked (or selected) according to a user input (or user touch/selection/control), a case in which a touch (or a screen touch) on the display unit 140 is detected, a case in which movement of an object is detected in additionally acquired (or captured/input) image information, or the like.

That is, when the preset event occurs, the display unit 140 adjusts the brightness of the corresponding display unit 140 in a minimum brightness state to preset basic brightness, stops displaying the pop-up message, and displays (or outputs) additionally acquired image information (or additional image information/general image information). In this case, when the panel of the display unit 140 is in a turned-off state, the display unit 140 may turn on the panel of the display unit 140 that is in a turned-off state, may stop the operation of the soft power LED that is being controlled to blink, and may display (or output) additionally acquired image information (or additional image information/general image information).

The voice output unit 150 outputs voice information included in a signal that has been subjected to predetermined signal processing by the control unit 160. Here, the voice output unit 150 may include a receiver, a speaker, a buzzer, or the like.

In addition, the voice output unit 150 outputs a guidance voice generated by the control unit 160.

In addition, the voice output unit 150 outputs voice information (or sound effects) corresponding to various types of image information or the like acquired through the camera unit 110 under the control of the control unit 160.

The control unit 160 (a controller or a microcontroller unit (MCU)) executes an overall control function of the still image detection device 100.

In addition, the control unit 160 executes the overall control function of the still image detection device 100 using a program and data stored in the storage unit 130. The control unit 160 may include a RAM, a ROM, a CPU, a GPU, and a bus, and the RAM, the ROM, the CPU, the GPU, and the like may be connected to each other through the bus. The CPU may access the storage unit 130 to perform booting using an operating system (O/S) stored in the storage unit 130 and may perform various operations using various programs, content, data, or the like stored in the storage unit 130.

In addition, when the brightness of the display unit 140 is adjusted to the minimum brightness and a pop-up message is displayed, the control unit 160 broadcasts, through the communication unit 120, alarm information including information indicating that the brightness of image information being displayed on the display unit 140 is adjusted, a pop-up message, or the like to one or more terminals (not shown) located within a preset radius from the still image detection device 100 (or the camera unit 110/the preset area).

Accordingly, one or more terminals located within the preset radius from the still image detection device 100 (or the camera unit 110/the preset area) receive the alarm information transmitted from the still image detection device 100 and display (or output) the received alarm information to confirm that a state of the display unit 140 (or a state of the OLED panel constituting the display unit 140) has been changed.

In addition, when the brightness of the display unit 140 is adjusted to the minimum brightness and a time for which a pop-up message is displayed has passed (or exceeded) a preset reference time (for example, including 30 minutes, 45 minutes, or 60 minutes), the control unit 160 broadcasts other alarm information including information indicating that the panel of the display unit 140 is in a turned-off state to one or more terminals located within a preset radius from the still image detection device 100 (or the camera unit 110/the preset area) through the communication unit 120.

Accordingly, one or more terminals located within the preset radius from the still image detection device 100 (or the camera unit 110/the preset area) receive other alarm information transmitted from the still image detection device 100 and display (or output) the received other alarm information to confirm that a state of the display unit 140 has been changed to a turned-off state.

In addition, when the brightness of the display unit 140 is adjusted to the minimum brightness and a pop-up message is displayed, or when the brightness of the display unit 140 is adjusted to the minimum brightness and a time for which a pop-up message is displayed has passed (or exceeded) a preset reference time (for example, including 30 minutes, 45 minutes, or 60 minutes), the control unit 160 interworks with one or more IoT devices located within a preset radius from the still image detection device 100 (or the camera unit 110/the preset area) to display (or output) corresponding alarm information or other alarm information through the one or more IoT devices.

In addition, when the brightness of the display unit 140 is adjusted to the minimum brightness and a pop-up message is displayed, or when the brightness of the display unit 140 is adjusted to the minimum brightness and a time for which a pop-up message is displayed has passed (or exceeded) a preset reference time (for example, including 30 minutes, 45 minutes, or 60 minutes), the control unit 160 interworks with the one or more IoT devices and controls at least one IoT device that is in a turned-on state among the one or more IoT devices to be changed from the on state to a turned-off state (or a standby state).

For example, when the brightness of the display unit 140 is adjusted to the minimum brightness and a time for which a pop-up message is displayed has passed (or exceeded) a preset reference time (for example, including 30 minutes, 45 minutes, or 60 minutes), the control unit 160 interworks with a smart light, an air conditioner, a fan, or the like located within a preset radius from the still image detection device 100 to change an operating state of the smart light, the air conditioner, the fan, or the like from a turned-on state to a turned-off state (or a standby state).

In the embodiment of the present invention, it has been mainly described that, in order to reduce the load of the control unit 160 constituting the still image detection device 100, the display unit 140 (or the microcomputer provided in the display unit 140) itself provides a brightness adjustment function, an alarm provision function (or a pop-up message provision function), and the like of the display unit 140 for image information related to a preset special purpose (or special situation) and image information related to a preset area of interest through analysis of image information, but the present invention is not limited thereto. One or more control functions (for example, including a brightness adjustment function, an alarm provision function, and the like) performed by the display unit 140 described above may be performed by the control unit 160 interworking with the display unit 140.

In this way, when a preset specific area of an image output from a surgical imaging device is detected and it is detected based on an input image type that the image is a still image, the brightness of the display unit may be adjusted to preset minimum brightness, and then a pop-up message may be displayed, when a preset reference time has elapsed, the panel of the corresponding display unit may be turned off, and the soft power LED provided in the display unit may be controlled to blink, and when a button is clicked according to a user input or movement of an object is detected in input image information, the panel of the corresponding display unit may be turned on, and an input image may be displayed.

In addition, in this way, in a state in which it is identified based on an input image type that an image is a general image, when the image is detected to be a still image in which there is no movement in the entire image, the brightness of the display unit may be adjusted to the preset minimum brightness, and a pop-up message may be displayed.

Hereinafter, a still image detection method according to the present invention will be described in detail with reference to FIGS. 1 to 3.

Figure 2:
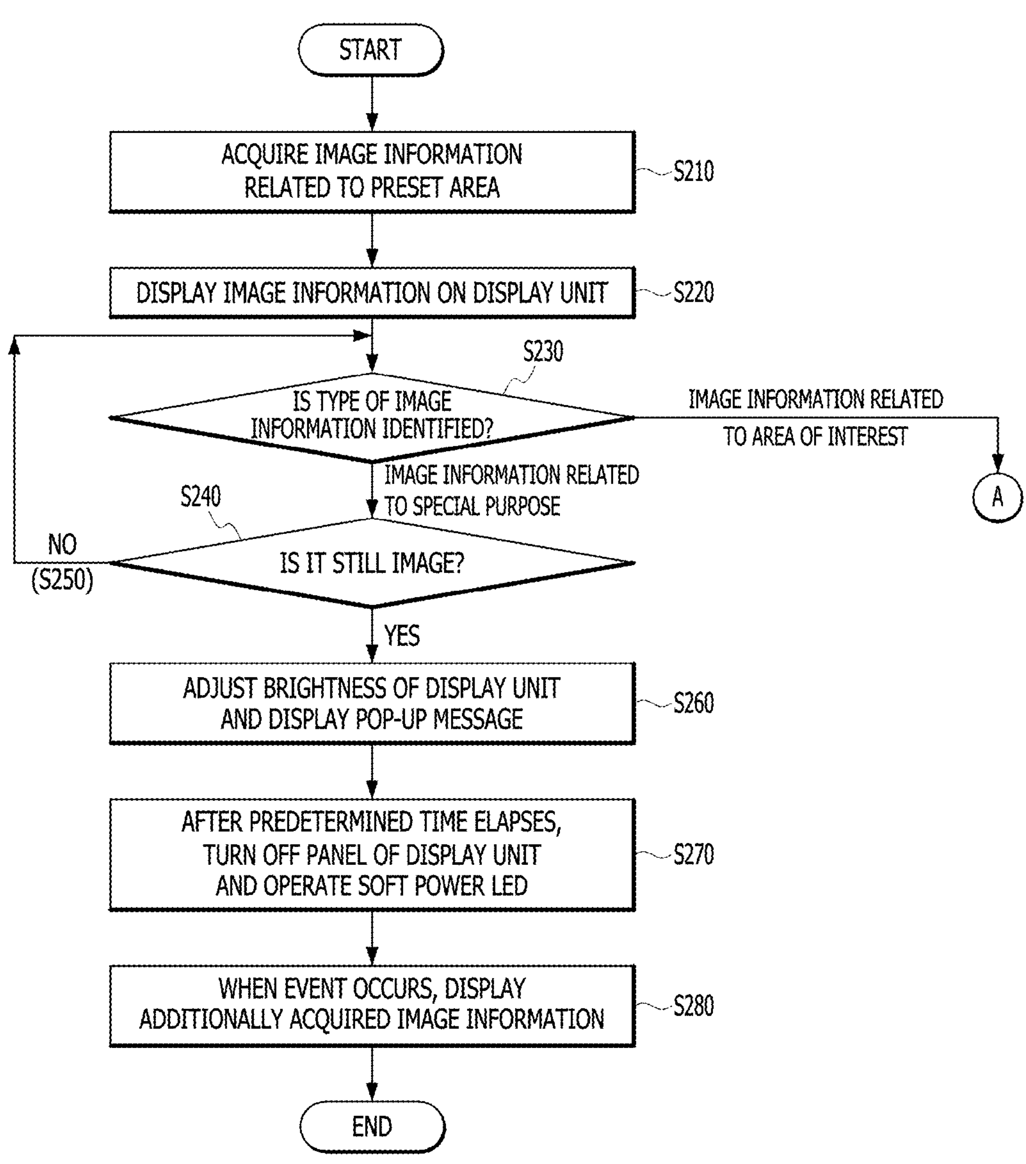
FIGS. 2 and 3 are flowcharts illustrating a still image detection method according to an embodiment of the present invention.
Figure 3:
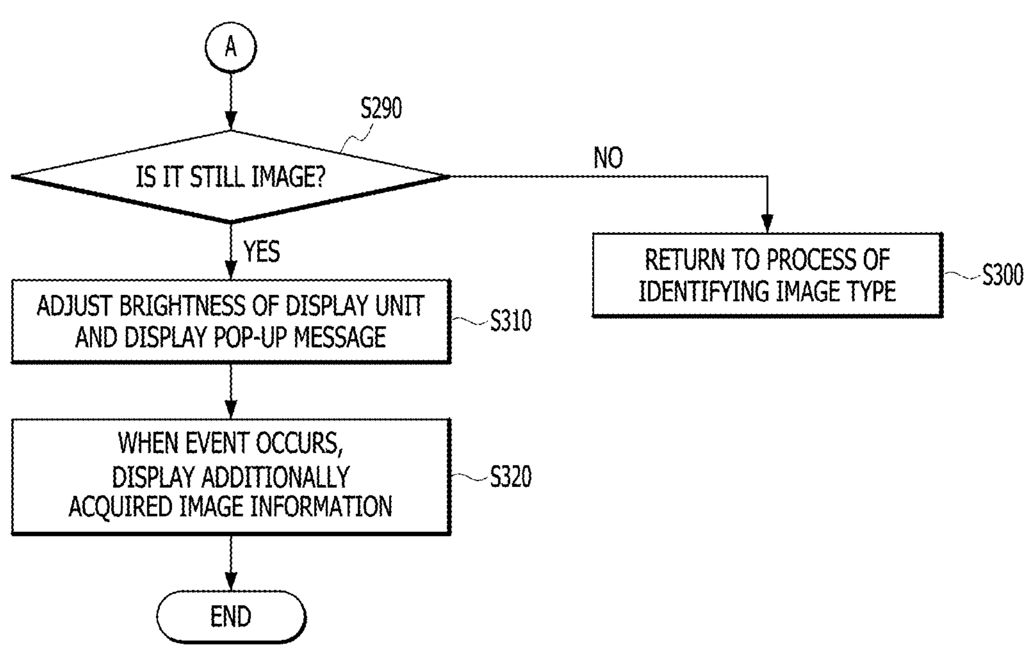

FIGS. 2 and 3 are flowcharts illustrating the still image detection method according to an embodiment of the present invention.

First, the camera unit 110 acquires (or captures) image information related to a preset area. Here, the preset area includes an area including an operating table in an operating room related to a preset special purpose, an area of interest set by a user (for example, including a living room/room in a house, a conference room, a public place, a street, or the inside/outside of a store), or the like. In this case, the camera unit 110 acquires (or captures) image information (for example, surgical scene image information/operating room image information in a special-purpose operating room or general image information including an area of interest) including an area (or a guideline area) in a preset guideline displayed on a viewfinder screen of the camera unit 110.

That is, the camera unit 110 acquires (or captures) the image information including surgical scene image information including a surgical scene in a preset surgical room (or surgical room image information including the inside of the surgical room), or general image information (or an image/photo/moving image) related to the area of interest (or a general area of interest).

For example, a first camera unit 110 acquires first surgical scene image information (or first image information) including a surgical scene in a first operating room in an ABCDE hospital.

As another example, a second camera unit 110 acquires second general image information (or second image information) related to a second area of interest in a ZYX Park that is a public place (S210).

Thereafter, the control unit 160 displays (or outputs) image information acquired (or captured) by the camera unit 110 through the display unit 140. In this case, the control unit 160 may perform a preset preprocessing function on the acquired image information and then may display preprocessed image information on the display unit 140. Here, the preprocessing function includes a function of removing unnecessary areas included in the acquired image information, a function of adjusting brightness, a function of adjusting sharpness, a function of adjusting wrinkles, a function of removing diffuse reflection, and the like.

For example, a first control unit 160 displays the first surgical scene image information acquired through the first camera unit on the first display unit 140.

As another example, a second control unit 160 displays the second general image information acquired through the second camera unit on the second display unit 140 (S220).

Thereafter, the display unit 140 identifies (or distinguishes/determines/classifies) an image type by analyzing the image information being displayed. In this case, the display unit 140 may include a microcomputer (or a display control unit) (not shown).

That is, the display unit 140 analyzes a scene in the image information being displayed (or the acquired/captured image information) to identify whether the image information is image information related to a preset special purpose (or special situation) or general image information related to a general area of interest. Here, the image information related to the special purpose (or special situation) includes surgical scene image information related to an operating room, experimental scene image information related to a laboratory, and the like. In this case, the display unit 140 may also identify whether the image information is the image information related to the preset special purpose or the general image information related to the general area of interest based on information about a place in which the camera unit 110 that obtains the image information is installed. Here, the information about the place in which the camera unit 110 is installed includes a unique ID (or unique information/number), location information (or address), installation purpose, or the like in relation to the place in which the camera unit 110 is installed.

As an example, the first display unit analyzes a scene in the first surgical scene image information being displayed to determine whether the first surgical scene image information is image information related to a preset special-purpose operating room situation.

As another example, the second display unit analyzes a scene in the second general image information being displayed to determine whether the second general image information is the image information related to the preset special purpose or the general image information related to the general area of interest (S230).

When it is identified based on the result of the identification (or the result of the distinguishment/determination/classification) that an image type of the identified image information is the surgical scene image information, the display unit 140 analyzes a preset specific area of the surgical scene image information (or the image information) to determine (or identify) whether the surgical scene image information is a still image.

That is, when the image information is identified to be the image information related to the special purpose as the result of the identification, the display unit 140 processes the areas, excluding the preset specific area among the surgical scene image information (or the image information) which is the image information related to the special purpose, as areas to be ignored because the image information continues to change even when is a moving image, and continuously monitors an image of the specific area to detect (or determine/identify) whether there is movement of an object (or whether the image is a still image). In addition, the specific area may have a quadrangular shape, a rectangular shape, a circular shape, a rhombus shape, a triangular shape, or the like with a preset size based on center coordinates (or preset reference coordinates) of corresponding image information.

As an example, when the first surgical scene image information is the image information related to the preset special-purpose operating room situation, the first display unit monitors a preset first specific area with a quadrangular shape in the first surgical scene image information preset based on center coordinates to determine whether movement of an object is detected (S240).

When, as the result of the determination (or the result of the identification), it is determined (or identified) based on the analysis of the surgical scene image information (or the image information) that the surgical scene image information is not the still image, the display unit 140 performs (or returns to) a process of analyzing image information (or additional image information) previously acquired (or captured) through the camera unit 110 to identify an image type.

That is, when, as the result of the determination (or the result of the identification), the image of the specific area of the surgical scene image information (or the image information) that is the image information related to the special purpose is continuously monitored, and the movement of the object is detected, the display unit 140 performs (or returns to) a process of analyzing image information (or additional image information) previously acquired (or captured) through the camera unit 110 to identify an image type.

As an example, when movement of a first object is detected in the first specific area of the first surgical scene image information, the first display unit performs a process of identifying whether additional image information acquired through the first camera unit is image information related to the preset special purpose or image information related to the general area of interest (S250).

In addition, when, as the result of the determination (or the result of the identification), it is determined based on the analysis of the surgical scene image information (or the image information) that the surgical scene image information is a still image, the display unit 140 adjusts the brightness of the display unit 140 to preset minimum brightness such that a user may recognize a current state and displays (or outputs) a preset pop-up message (for example, including "Still Image Detected Display will sleep in 2 mins").

That is, when, as the result of the determination (or the result of the identification), the image of the specific area of the surgical scene image information (or the image information) that is the image information related to the special purpose is continuously monitored, and movement of an object is not detected for a preset time or more, the display unit 140 adjusts the brightness of the display unit 140 to the preset minimum brightness such that a user may recognize a current state and displays (or outputs) a preset pop-up message (for example, including "Still Image Detected Display will sleep in 2 mins").

In this case, when no signal (or no acquired image information) is input to the display unit 140, the display unit 140 displays (or outputs) a preset no-signal image (or a No signal image).

In addition, the display unit 140 reads (or checks) luminance data (for example, a 32-gray level) of a specific area in the no-signal image at preset time intervals (for example, a 1-second interval) using a histogram, and when a luminance component of the no-signal image is the same as a luminance component (or luminance data) of the read specific area for a preset specific time (for example, 45 minutes or 60 minutes), the display unit 140 recognizes the surgical scene image information as a still image, adjusts the brightness of the display unit 140 to the preset minimum brightness, and displays (or outputs) a preset pop-up message (for example, including "Still Image Detected Display will sleep in 2 mins").

As an example, when movement of an object is not detected for a preset time of 45 minutes in the first specific area of the first surgical scene image information, the first display unit displays the pop-up message (for example, including "Still Image Detected Display will sleep in 2 mins") as a pop-up on a screen on which the first surgical scene image information is displayed, and adjusts the brightness of the first display unit to preset minimum brightness to display the pop-up message (S260).

Afterwards, when the brightness of the display unit 140 is adjusted to the minimum brightness and a time for which a pop-up message is displayed has passed (or exceeded) a preset reference time (for example, including 30 minutes, 45 minutes, or 60 minutes), the display unit 140 turns off a panel (or an OLED panel) of the display unit 140 such that a user may recognize a current state, and controls a soft power LED (not shown) provided in the display unit 140 to blink.

As an example, when the pop-up message is displayed on the first display unit, the brightness of the first display unit is adjusted to the preset minimum brightness and a time for which the pop-up message is displayed passes a reference time of 60 minutes, the first display unit turns off an OLED panel of the first display unit and controls a first soft power LED provided in the first display unit to blink (S270).

Thereafter, when a preset event occurs, the display unit 140 turns on the panel of the display unit 140 and displays (or outputs) image information (or surgical scene image information) additionally acquired through the camera unit 110. Here, the preset event includes a case in which any button constituting the still image detection device 100 is clicked (or selected) according to a user input (or user touch/selection/control), a case in which a touch (or a screen touch) on the display unit 140 is detected, a case in which movement of an object is detected in additionally acquired (or captured/input) image information, or the like.

That is, when the preset event occurs, the display unit 140 turns on the panel of the display unit 140 that is in a turned-off state, stops the operation of the soft power LED that is being controlled to blink, and displays (or outputs) additionally acquired image information (or additional image information/surgical scene image information).

As an example, when a touch on a specific button displayed on the first display unit is detected according to a first user touch in a state in which the OLED panel of the first display unit is in a turned-off state, and the soft power LED blinks, the first display unit changes the OLED panel of the first display unit from a turned-off state to a turned-on state, stops a blinking state of the first soft power LED, and displays additionally acquired first surgical scene image information (S280).

In addition, when it is identified based on the result of the identification (or the result of thy distinguishment/determination/classification) that the image type of the identified image information is general image information, the display unit 140 analyzes the entire image (or entire area) of the general image information (or the image information) to determine (or confirm) whether the image is a still image.

That is, when, as the result of the identification, it is identified that the image information is not the image information related to the special purpose (or when the image information is identified to be the general image information related to the area of interest), irrespective of a type, pattern, or the like of the image information, the display unit 140 continuously monitors the entire image of the general image information (or the image information) to detect (or determine/identify) whether there is movement of an object (or whether the image is a still image).

As an example, when the second general image information is not the image information related to the preset special purpose, the second display unit monitors the entire area of the second general image information to determine whether movement of an object is detected (S290).

When, as the result of the determination (or the result of the identification), it is determined based on the analysis of the general image information (or the image information) that the general image information (or the image information) is not the still image, the display unit 140 performs (or returns to) a process of analyzing image information (or additional image information) previously acquired (or captured) through the camera unit 110 to identify an image type.

That is, when, as the result of the determination (or the result of the identification), the entire image of the general image information (or the image information) that is the image information related to the area of interest is continuously monitored, and a movement of an object is detected, the display unit 140 performs (or returns to) a process of analyzing image information (or additional image information) previously acquired (or captured) through the camera unit 110 to identify an image type.

An example, when movement of a second object is detected in the entire area of the second general image information, the second display unit performs a process of identifying whether additional image information acquired through the second camera unit is the image information related to the preset special purpose or the general image information related to the general area of interest (S300).

In addition, when, as the result of the determination (or the result of the identification), it is determined based on the analysis of the general image information (or the image information) that the general image information is a still image, the display unit 140 adjusts the brightness of the display unit 140 to preset minimum brightness such that a user may recognize a current state and displays (or outputs) a preset pop-up message (for example, including "Still Image Detected Display will sleep in 2 mins").

That is, when, as the result of the determination (or the result of the identification), an image of the entire area of the general image information (or the image information) that is the image information related to the area of interest is continuously monitored, and a movement of an object is not detected for a preset time or more, the display unit 140 adjusts the brightness of the display unit 140 to the preset minimum brightness such that a user may recognize a current state and displays (or outputs) a preset pop-up message (for example, including "Still Image Detected Display will sleep in 2 mins").

In this case, the display unit 140 reads (or checks) luminance data of the entire area in the general image information at preset time intervals (for example, a 1 second interval) using, and when the same (or identical) luminance data is read for a preset specific time (for example, including 45 minutes or 60 minutes) (or there is no change in luminance data for a preset specific time), the display unit 140 recognizes the general image information as a still image, adjusts the brightness of the display unit 140 to preset minimum brightness, and displays (or outputs) a preset pop-up message (for example, including "Still Image Detected Display will sleep in 2 mins").

As an example, when movement of an object is not detected for a preset time of 45 minutes in the entire area of the second general image information, the second display unit displays the pop-up message (for example, including "Still Image Detected Display will sleep in 2 mins") as a pop-up on a screen on which the second surgical scene image information is displayed, and adjusts the brightness of the second display unit to preset minimum brightness to display the pop-up message (S310).

Thereafter, when a preset event occurs, the display unit 140 turns on (or activates) the panel of the display unit 140 and displays (or outputs) image information (or general image information) additionally acquired through the camera unit 110. Here, the preset event includes a case in which any button constituting the still image detection device 100 is clicked (or selected) according to a user input (or user touch/selection/control), a case in which a touch (or a screen touch) on the display unit 140 is detected, a case in which movement of an object is detected in additionally acquired (or captured/input) image information, or the like.

That is, when the preset event occurs, the display unit 140 adjusts the brightness of the corresponding display unit 140 in a minimum brightness state to preset basic brightness, stops displaying the pop-up message, and displays (or outputs) additionally acquired image information (or additional image information/general image information).

As an example, when movement of a third object is detected in additionally acquired third general image information in a state in which the brightness of the second display unit is preset minimum brightness, and the pop-up message is displayed, the second display unit adjusts the brightness of the second display unit in the minimum brightness state to preset basic brightness, stops displaying the pop-up message being displayed, and displays the additionally acquired third general image information (S320).

As described above, in the embodiment of the present invention, when a preset specific area of an image output from a surgical imaging device is detected, and it is detected based on input image type that the image is a still image, the brightness of the display unit may be adjusted to preset minimum brightness, and then a pop-up message may be displayed, when a preset reference time has elapsed, the panel of the corresponding display unit may be turned off, and the soft power LED provided in the display unit may be controlled to blink, and when a button is clicked according to a user input, or movement of an object is detected in input image information, the panel of the corresponding display unit may be turned on, and an input image may be displayed, thereby preventing the occurrence of afterimages and burnout in a state in which a still image is displayed on the display unit for a long time.

In addition, in a state in which an image is identified to be a general image based on an input image type, when the image is detected to be a still image in which there is no movement in the entire image, the brightness of the display unit is adjusted to preset minimum brightness, and a pop-up message is displayed, thereby improving a power management function of the entire display unit.

In the present invention, when a preset specific area of an image output from a surgical imaging device is detected and it is detected based on an input image type that the image is a still image, the brightness of a display unit is adjusted to preset minimum brightness, and then a pop-up message is displayed, when a preset reference time has elapsed, a panel of the display unit is turned off, and a soft power LED provided in the display unit is controlled to blink, and when a button is clicked according to a user input, or movement of an object is detected in input image information, the panel of the display unit is turned on, and an input image is displayed, thereby preventing the occurrence of afterimages and burnout in a state in which a still image is displayed on the display unit for a long time.

In addition, in the present invention, in a state in which it is identified based on an input image type that an image is a general image, when the image is detected to be a still image in which there is no movement in the entire image, the brightness of a display unit is adjusted to preset minimum brightness, and a pop-up message is displayed, thereby improving a power management function of the entire display unit.

The above-described content may be modified and altered by those skilled in the art to which the present invention pertains without departing from the essential spirit or scope of the present invention. Accordingly, embodiments disclosed in the present invention are not intended to limit the technical idea of the present invention, but are for illustrative purposes, and the scope of the technical idea of the present invention is not limited by these embodiments. The spirit and scope of the present invention should be interpreted by the appended claims and encompass all equivalents falling within the scope of the appended claims.

What is claimed is:

1. A still image detection device comprising:

a camera unit configured to acquire image information related to a preset area;

a control unit configured to perform control such that the acquired image information is displayed on a display unit; and the display unit which analyzes the image information being displayed to identify an image type, when the identified image type of the image information is identified to be surgery scene image information related to a preset special purpose as a result of the identification, analyzes a preset specific area of the surgery scene image information to determine whether the surgery scene image information is a still image, when the surgery scene image information is determined to be the still image as a result of the determination, adjusts brightness of the display unit to preset minimum brightness, and displays a preset pop-up message, and when the brightness of the display unit is adjusted to the minimum brightness and a time for which the pop-up message is displayed exceeds a preset reference time, turns off a panel of the display unit, and controls a soft power light-emitting diode (LED) provided in the display unit to blink, wherein the preset area includes an area related to the preset special purpose and an area of interest according to a user setting.

2. The still image detection device of claim 1, wherein the display unit includes a microcomputer, and when the identified image type of the image information is identified to be general image information related to a preset area of interest as a result of the identification, an entire image of the general image information is analyzed to determine whether the general image information is a still image, when the general image information is determined to be the still image as a result of the determination, the brightness of the display unit is adjusted to the preset minimum brightness, and the preset pop-up message is displayed, and when a preset event occurs, the brightness of the display unit in a minimum brightness state is adjusted to the preset basic brightness, the display of the pop-up message is stopped, and additionally acquired image information is displayed.

3. A still image detection method comprising:

acquiring, by a camera unit, image information related to a preset area;

displaying, by a control unit, the acquired image information on a display unit;

analyzing, by the display unit, the image information being displayed to identify an image type;

when the identified image type of the image information is identified to be surgery scene image information related to a preset special purpose as a result of the identification, analyzing, by the display unit, a preset specific area of the surgery scene image information to determine whether the surgery scene image information is a still image;

when the surgery scene image information is determined to be the still image as a result of the determination, adjusting, by the display unit, brightness of the display unit to preset minimum brightness, and displaying a preset pop-up message; and when the brightness of the display unit is adjusted to the minimum brightness and a time for which the pop-up message is displayed exceeds a preset reference time, turning off, by the display unit, a panel of the display unit, and controlling a soft power light-emitting diode (LED) provided in the display unit to blink, wherein the preset area includes an area related to the preset special purpose and an area of interest according to a user setting.

4. The still image detection method of claim 3, wherein the adjusting of the brightness of the display unit to the preset minimum brightness and the displaying of the preset pop-up message include:

a process of displaying, by the display unit, a preset no-signal image when no signal is input to the display unit;

a process of reading luminance data of a specific area in the no-signal image at preset time intervals using a histogram; and a process of, when a luminance component of the no-signal image is the same as a luminance component of the read specific area for a preset specific time, recognizing the surgery scene image information as the still image, adjusting the brightness of the display unit to the preset minimum brightness, and displaying the preset pop-up message.

5. The still image detection method of claim 3, further comprising, when a preset event occurs, turning on, by the display unit, a panel of the display unit, and displaying image information additionally acquired through the camera unit.

6. The still image detection method of claim 3, further comprising:

when the identified image type of the image information is identified to be general image information related to a preset area of interest as a result of the identification, analyzing, by the display unit, an entire image of the general image information to determine whether the general image information is a still image;

when the general image information is determined to be the still image as a result of the determination, adjusting, by the display unit, the brightness to the preset minimum brightness, and displaying a preset pop-up message; and when a preset event occurs, adjusting, by the display unit, the brightness of the display unit in a minimum brightness state to the preset basic brightness, stopping displaying the pop-up message, and displaying additionally acquired image information.

* * * * *